United States Patent [19]

Mennemeyer

[11] Patent Number: 5,613,466
[45] Date of Patent: Mar. 25, 1997

[54] KNOCKDOWN BIRDHOUSE

[76] Inventor: Arthur A. Mennemeyer, 4142 Mesa Verde Ave. NE., #4, Albuquerque, N.M. 87110

[21] Appl. No.: 453,366

[22] Filed: May 30, 1995

[51] Int. Cl.⁶ ................................................. A01K 31/00
[52] U.S. Cl. ................................................. 119/431; 119/491
[58] Field of Search .................................. 119/431, 491, 119/498, 513

[56]           References Cited

U.S. PATENT DOCUMENTS

| | | |
|---|---|---|
| D. 170,833 | 11/1953 | Rebora . |
| 837,937 | 12/1906 | Legg ........................................ 119/491 |
| 930,108 | 8/1909 | Walcutt . |
| 982,703 | 1/1911 | Brainard ................................. 119/491 |
| 984,977 | 2/1911 | Stokes . |
| 1,018,007 | 2/1912 | Rogers ................................... 119/491 |
| 1,130,818 | 3/1915 | Herman . |
| 1,313,691 | 8/1919 | Hixson . |
| 1,329,104 | 1/1920 | Ballin . |
| 1,791,956 | 2/1931 | Cowles . |
| 2,092,055 | 9/1937 | Hackett .................................. 119/498 |
| 2,190,721 | 2/1940 | Mallgraf . |
| 2,230,305 | 2/1941 | Mallgraf . |
| 2,292,614 | 8/1942 | Copeman . |
| 2,424,733 | 7/1947 | Benson . |
| 2,666,414 | 1/1954 | Burr et al. . |
| 2,915,040 | 12/1959 | Ward ....................................... 119/431 |
| 3,053,226 | 9/1962 | Dunn . |
| 3,195,507 | 7/1965 | Miller ..................................... 119/431 |
| 3,198,172 | 8/1965 | Crane, Jr. . |
| 3,211,130 | 10/1965 | Prince . |
| 3,250,249 | 5/1966 | Nelson et al. . |
| 3,295,498 | 1/1967 | Brown . |
| 3,581,708 | 6/1971 | Beck et al. . |
| 3,602,196 | 8/1971 | Tucci . |
| 3,945,344 | 3/1976 | Melrath . |
| 5,479,877 | 1/1996 | Demboske ........................... 119/431 X |

*Primary Examiner*—Robert P. Swiatek
*Assistant Examiner*—Yvonne R. Abbott
*Attorney, Agent, or Firm*—Pollock, Vande Sande & Priddy

[57]           ABSTRACT

A knock-down birdhouse including a front member including an entrance, a rear member, a right side member, a left two side member, a floor member, and a roof member including at least two lip members provided at least partially around opposite inside surfaces of the roof member in the vicinity of an edge of the roof member such that the lip members face each other when the roof member is folded in half. In a disassembled state, the roof member may be folded over to accommodate all other members of the knock-down birdhouse. The birdhouse members are retained within the folded-over roof member by the lip member.

20 Claims, 14 Drawing Sheets

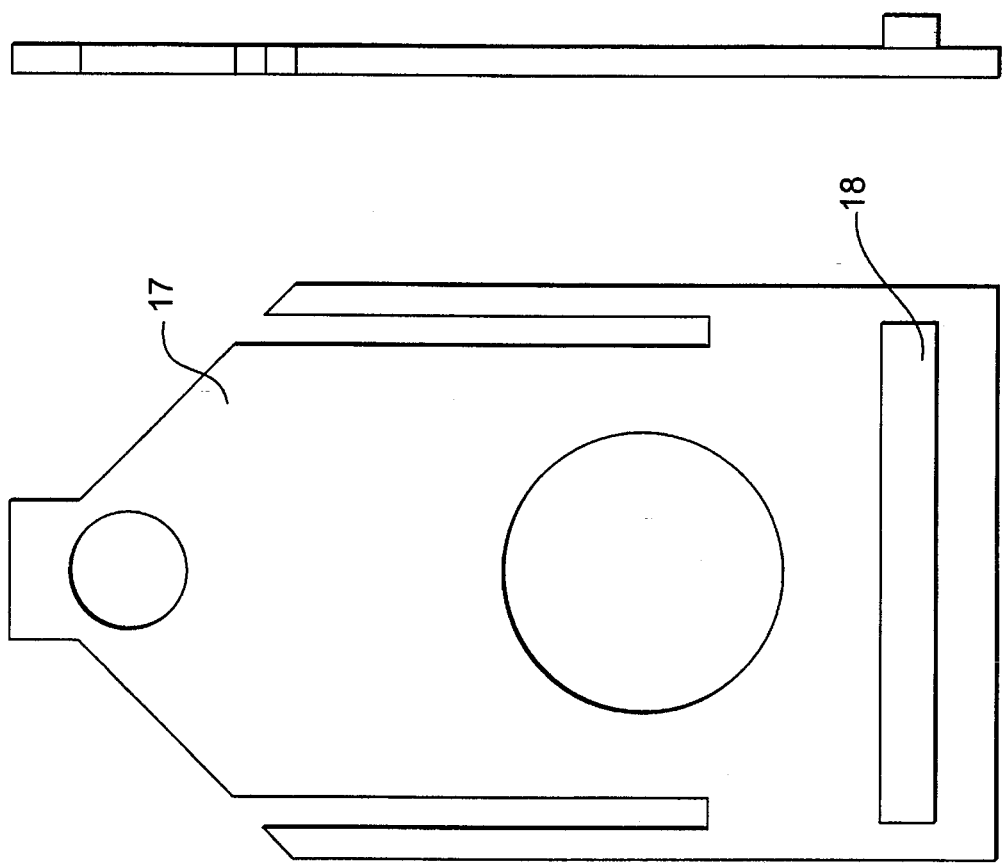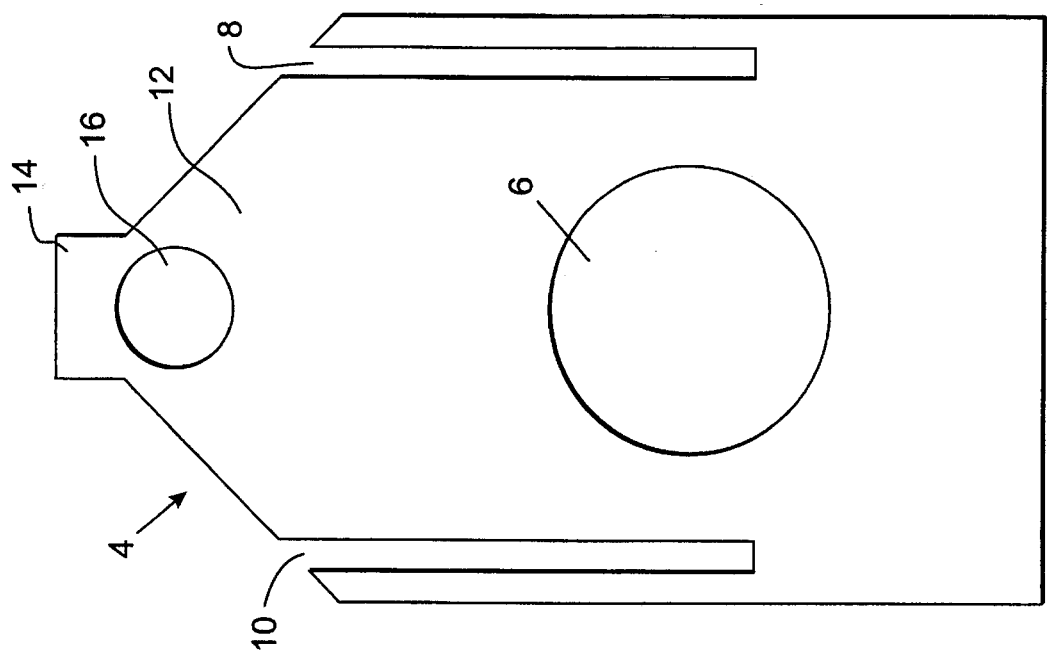

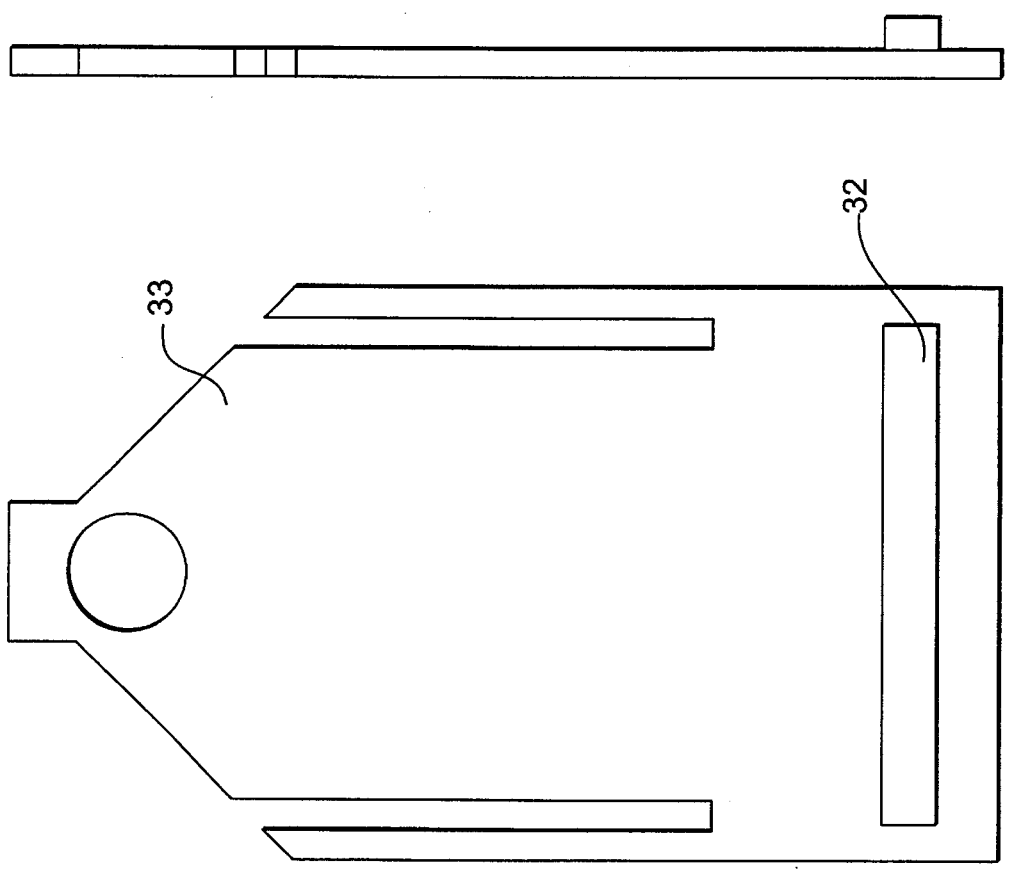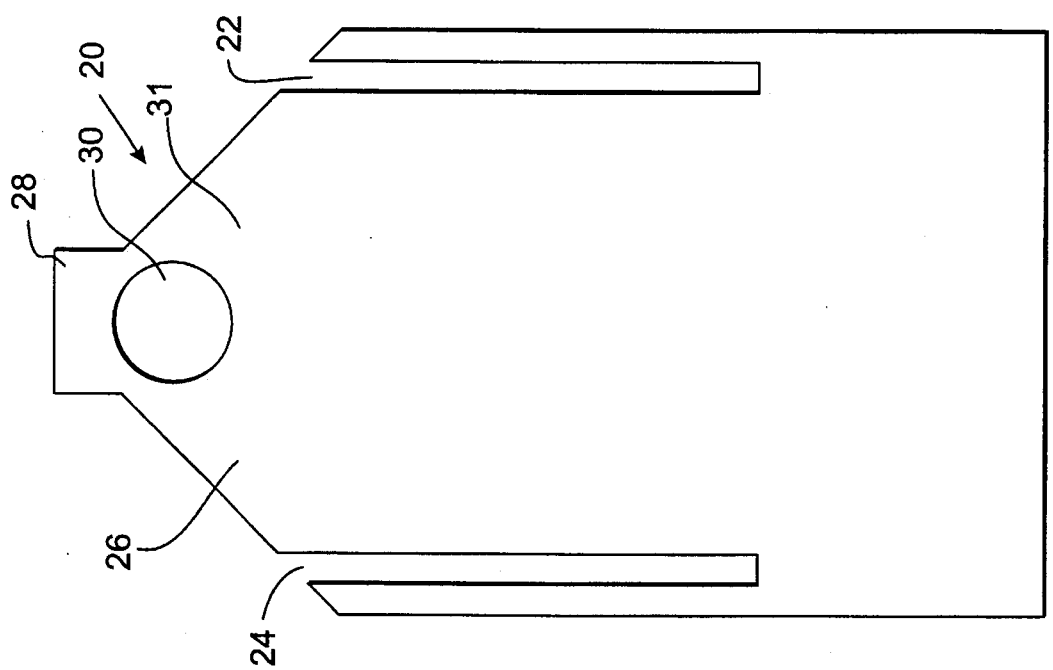

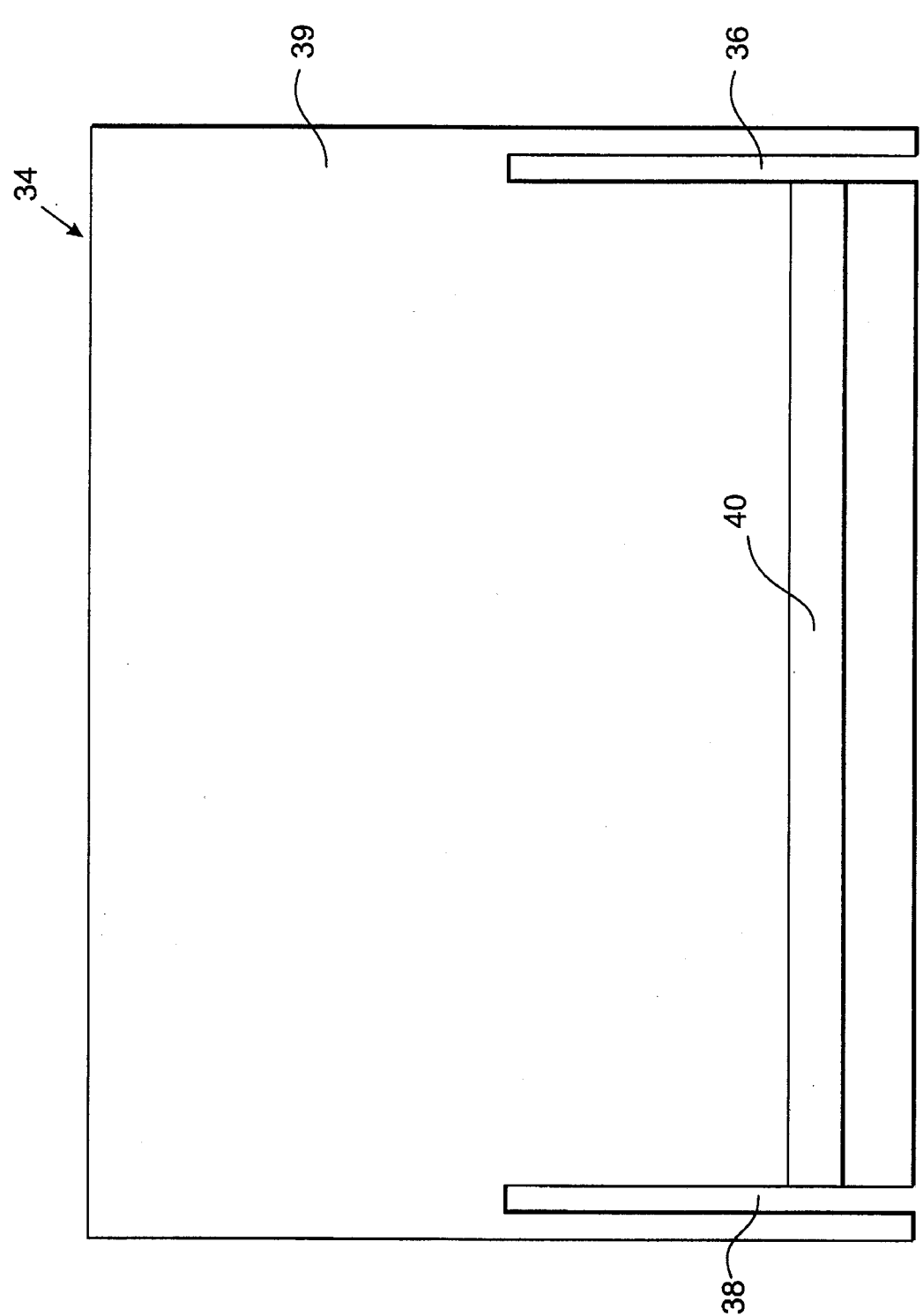

KNOCKDOWN BIRDHOUSE

FIELD OF THE INVENTION

The invention relates to a birdhouse, in particular to a knockdown birdhouse, and especially to a knockdown birdhouse, the components of which may be contained by one of the members of the birdhouse. The present invention also relates to methods for assembling a knockdown birdhouse and packaging a knockdown birdhouse in a roof member of the knockdown birdhouse.

BACKGROUND OF THE INVENTION

Watching birds has, for a long time, been a popular activity. In an effort to attract birds to watch, many people place birdfeeders, birdbaths, and birdhouses in their yards. Attracting birds in this manner serves many purposes, including entertaining and educating people viewing the birds attracted by the peoples' activities. Providing food, water, and shelter also helps to preserve and protect the birds that frequent the birdhouses, birdbaths, and birdfeeders. People are also employed manufacturing and marketing birdfeeders, birdhouses, and birdbaths. Additionally, many people also derive pleasure from designing and building their own birdfeeders, birdhouses, and birdbaths.

As our population expands and more natural habitat is destroyed to make room for more houses, roads, shopping malls and other aspects of human life, habitat for birds and other animals is destroyed. Therefore, it becomes more important that sources of food, water and shelter for birds are provided by people living in houses built where habitat has been destroyed. It is particularly important that we provide sources of shelter for birds to build nests in which they may lay their eggs and raise their young when trees and shrubs are cut down and cultivated and uncultivated fields are destroyed to build homes. Even if some sources of food are destroyed in the process of clearing trees to build houses, food may be available in the form of insects, seeds, berries, and other parts of flowers, bushes and trees still present. However, with large mature trees cut down, open fields filled with houses, and unique habitats destroyed, birds will lack a source of shelter.

For some time, stores have catered to birdlovers, making available a wide variety of houses, feeders, baths, and seed to attract birds. Preassembled birdhouses have been available in a variety of outlets including hardware stores, specialty stores such as The Nature Company, craft stores, and garden stores, among others. Furthermore, some stores have opened that deal only with bird-related merchandise.

Typically, birdhouses are sold preassembled. A person, after purchasing such a birdhouse, will hang the house from a tree limb, or attach it to a post, fence or other suitable site. In addition to preassembled birdhouses, plans are available for constructing birdhouses. Often, children design and construct birdhouses in shop class or girl or boy scouts, for example. Building a birdhouse appeals to peoples' sense of making things, to the do-it-yourself spirit, and provides people with satisfaction in creating something.

Building a birdhouse is an attractive option for people who wish to build things on their own to their own specification and design. For example, people may alter the design of the birdhouse plan to suit their needs and desires. However, some people lack the skill, tools, and/or space to allow them to construct such a birdhouse.

SUMMARY OF THE INVENTION

It is an object of the present invention to provide a knockdown birdhouse that may be easily assembled.

Another object of the present invention is to provide a knockdown birdhouse that may be easily packaged within one of the members of the birdhouse.

Accordingly, preferred aspects of the present invention provide a knockdown birdhouse including a front member including an entrance, a rear member, a right side member, a left side member, a floor member, and a roof member. The roof member includes at least two lip members provided at least partially around an inside surface of the roof member in the vicinity of an edge of the roof member such that the lip members face each other when the roof member is folded in half. In a disassembled state, the roof member is foldable to accommodate at least the front member, the rear member, the right side member, the left side member, and the floor member. The members of the birdhouse are retained within the foldable roof member by the lip members.

According to other preferred aspects, the invention also includes a method of building a birdhouse from a plurality of quickly assembled and disassembled members including a front member including an entrance hole, a rear member, a right side member, a left side member, a floor member, and a roof member. The front member includes a gable and a slot provided in the vicinity of a right side and a slot provided in the vicinity of a left side. The rear member includes a gable and a slot provided in the vicinity of a right side and a slot provided in the vicinity of a left side. The right side member includes a slot provided in the vicinity of a right side and a slot provided in the vicinity of a left side. The roof member includes a front member receiving slot and a rear member receiving slot. The roof member also includes at least two lip members provided at least partially around an inside surface of the roof member in the vicinity of an edge of the roof member such that the lip members face each other when the roof member is folded in half, thereby retaining within the foldable roof member the front member, the rear member, the right side member, the left side member, and the floor member, when the bird house is in a disassembled state. The right side member and the left side member and/or the front member and the rear member include a floor member supporting member.

The method includes the steps of aligning the slot in the vicinity of the left side of the right side member with the slot in the vicinity of the right side of the front member. At least one of the side member and the front member is moved toward each other in a direction parallel to the slots until a base of the slot in the side member contacts a base of the slot in the front member. The slot in the vicinity of the right side of the right side member is aligned with the slot in the vicinity of the left side of the rear member. At least one of the right side member and the rear member is moved toward the other in a direction parallel to the slots until a base of the slot of the right side member contacts a base of the slot of the rear member. The slot in the vicinity of right side of the left side member is aligned with the slot in the vicinity of the left side of the front member. At least one of the left side member and the front member is moved toward the other in a direction parallel to the slots until a base of the slot of the left side member contacts a base of the slot of the front member. The slot in the vicinity of the left side of the left side member is aligned with the slot in the vicinity of the right side of the rear member. At least one of the left side member and the rear member is moved toward the other in a direction parallel to the slots until a base of the slot of the left side member contacts a base of the slot of the rear member.

The floor member is positioned on the floor supporting members. The slots of the roof member are aligned with the gables of the front member and the rear member. At least one of the roof member and the front member and rear member is then moved toward the other until the gables of the front member and the rear member extend through the slots in the roof member and an underside of roof member contacts an upper surface of the right side member and the left side member.

According to further preferred aspects, the present invention provides a method of building a birdhouse from a plurality of quickly assembled and disassembled members including a front member including an entrance hole, a rear member, a right side member, a left side member, a floor member, and a roof member. The front member includes a gable and a groove provided in the vicinity of a right side and in the vicinity of a left side of an inside face of the front member. The rear member includes a gable and a groove provided in the vicinity of a right side and in the vicinity of a left side of an inside face of the rear member. The roof member includes a front member receiving slot and a rear member receiving slot. The roof member also includes at least two lip members provided at least partially around an inside surface of the roof member in the vicinity of an edge of the roof member such that the lip members face each other when the roof member is folded in half. In a disassembled state, the roof member is foldable to accommodate the front member, the rear member, the right side member, the left side member, and the floor member. The right side member and left side member and/or the rear members include a floor member supporting member.

The method includes the steps of placing a left edge of the right side member in the groove in the vicinity of the left side of the inside face of the front member. A right edge of the left side member is placed in the groove in the vicinity of the right side of the inside face of front member. The right edge of the right side member is placed in the groove in the vicinity of the right side of the inside face of the rear member. The left edge of the left side member is placed in the groove in the vicinity of the left side of the inside face of the rear member. The floor member is positioned on the floor member supporting members. The slots in the roof member are aligned with the front member and the rear member. At least one of the front member and the rear member and the roof member is moved toward the other until the front member gable and rear member gable extend through the slots in the roof member and underside of the roof member contacts an upper surface of the right side member and the left side member.

Additional preferred aspect of the invention provide a method of packaging a knockdown birdhouse. The birdhouse includes a plurality of quickly assembled and disassembled members including a front member including an entrance hole, a rear member, a left side member, a right side member, a floor member, and a roof member. The roof member includes at least two lip members provided at least partially around a surface of the roof member in the vicinity of an edge of the roof member such that the lip members face each when the roof member is folded in half. The method includes the steps of placing the front member, the rear member, the right side member, the left side member, and the floor member on an inside surface of the roof member. The roof member is folded along a middle portion, thereby bringing lip members into contact. The roof member may be held in a closed position with at least one securing member.

Still other objects and advantages of the present invention will become readily apparent to those skilled in this art from the following detailed description, wherein it is shown and described only the preferred embodiments of the invention, simply by way of illustration of the best mode contemplated of carrying out the invention. As will be realized, the invention is capable of other and different embodiments, and it's several details are capable of modifications in various obvious respects, without departing from the invention. Accordingly, the drawings and description are to be regarded as illustrative in nature and not as restrictive.

BRIEF DESCRIPTION OF THE DRAWINGS

FIG. 2a represents a view of an outside face of one embodiment of a front member of one embodiment of a knockdown birdhouse according to the invention;

FIG. 2b represents a view of an inside face of the embodiment of the front member shown in FIG. 2a;

FIG. 2c represents a right side view of the embodiment of the front member shown in FIGS. 2a and 2b;

FIG. 3a represents a view of an outside face of one embodiment of a rear member of one embodiment of a knockdown birdhouse according to the invention;

FIG. 3b represents a view of an inside face of the embodiment of the rear member shown in FIG. 3a;

FIG. 3c represents a right side view of the embodiment of the rear member shown in FIGS. 3 and 3b;

FIG. 4a represents a view of an inside face of one embodiment of a side member according to the invention;

FIG. 4b represents a right side view of the embodiment of the side member shown in FIG. 4a;

FIG. 5b represents a side view of the embodiment of the floor member shown in FIG. 5a;

DETAILED DESCRIPTION OF VARIOUS AND PREFERRED EMBODIMENTS

Figure 1:
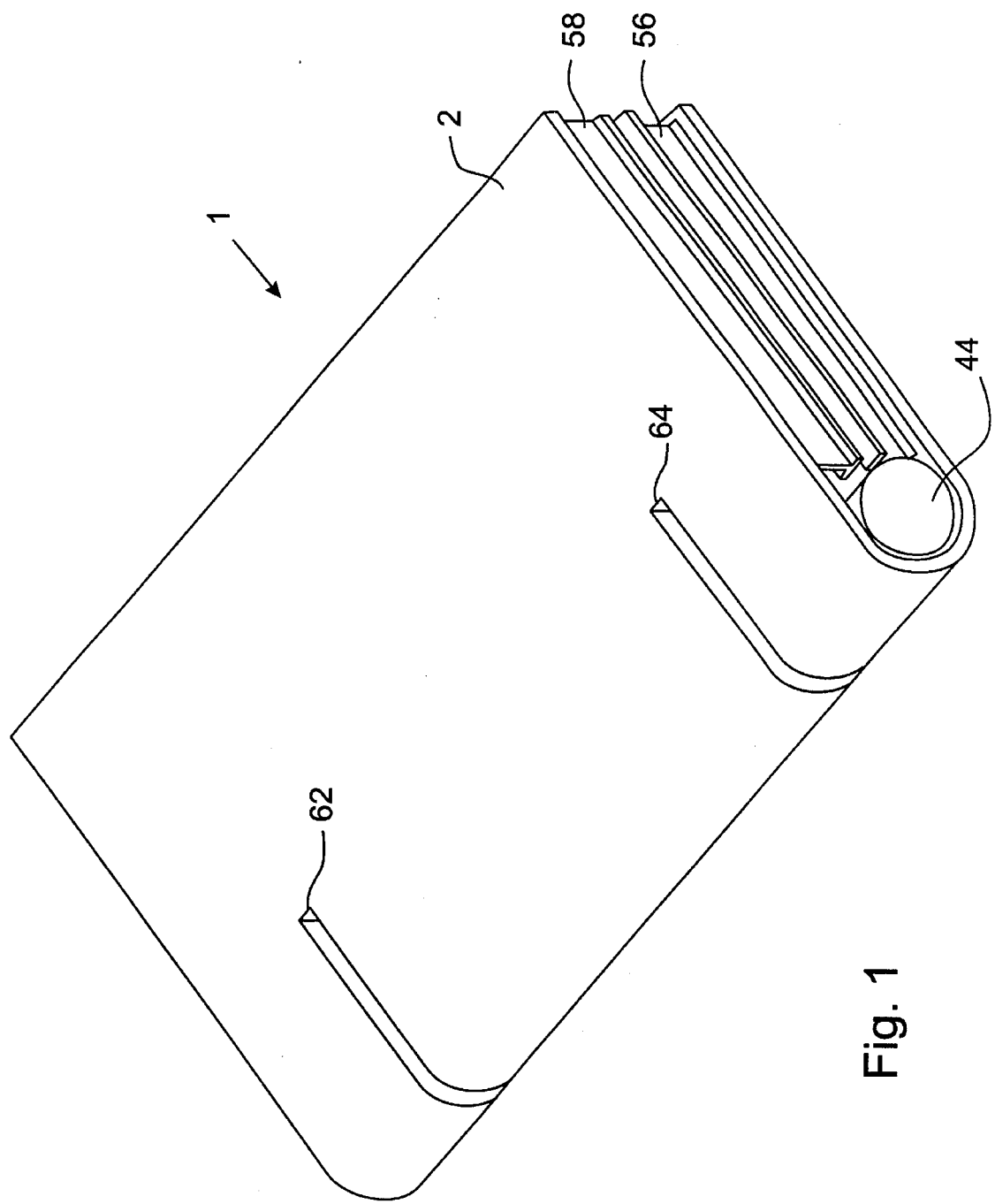
FIG. 1 represents a perspective view of one embodiment of a knockdown birdhouse according to the present invention packaged within a roof member of the birdhouse.

FIG. 1 shows one embodiment of a knockdown birdhouse according to the invention. As can be seen in FIG. 1, all of the components of the packaged birdhouse 1 may be enclosed within the roof member 2 of the birdhouse. The packaged birdhouse 1 may then be displayed for sale in such a manner. Accordingly, one of the advantages of the present invention is to reduce the amount of packaging material that is necessary to package the birdhouse. In fact, packaging material may be completely eliminated and the packaged birdhouse 1 sold as shown in FIG. 1.

This makes the birdhouse of the present invention environmentally friendly in a variety of ways. One way is that the birdhouse provides much needed shelter for birds. Another way is to avoid wasting resources in the form of packaging. In fact, as discussed below, components of the birdhouse of the invention may also be formed from partially or wholly recycled materials, making it even more environmentally friendly.

For example, a birdhouse according to the invention may be made of a variety of different materials. For instance, the components of the birdhouse could be made of plastic. Alternatively, the components of the birdhouse could be made of wood. Furthermore, the components or portions of the components could be made from a combination of plastic or wood. In some embodiments, some components of the birdhouse may be made of both wood and plastic. Other materials that may be used to form the birdhouse could be metal, composite materials, plastic coated paper materials, and any other suitable materials. In one embodiment, corrugated plastic board may be used. Any of the materials used to form components may be recycled. Also, any component may be made of one or more of the above-listed materials and the composition of the various components may differ from the other components.

The design of the birdhouse of the present invention also makes disassembly and storage of the birdhouse very easy since the connections between the components may not require any fasteners and/or tools. Additionally, as described below, since the birdhouse may be packaged within the roof member, the birdhouse will always have a package that may be used to store the birdhouse in. The ease with which the birdhouse may be disassembled makes it easy to clean as well. Furthermore, as stated above, the knockdown birdhouse of the invention appeals to peoples' sense of creativity, self reliance and making things for themselves.

As will shown and described below in greater detail, the birdhouse includes at least a front member, a rear member, a right side member, a left side member, a floor member, and a roof member. An embodiment of the front member of the present invention is shown in FIG. 2a. FIG. 2a shows an outside face of the front member 4. The outside face is the face of the front member (or any other component of the invention) that would be exposed in the completed birdhouse.

The front member 4 shown in FIGS. 2a–c is planar. However, the front member 4 and the other members of the bird house may have other contours. For example, the front and rear or side members may be curved.

Preferably, the front member includes an entrance passage 6 through which birds may enter and exit the birdhouse. The passage 6 preferably is located in a central portion of the front member 4 at least somewhat above the level where the floor member will be in a finished birdhouse so as to prevent baby birds or other materials, such as nesting material, within the birdhouse from easily falling out. The entrance passage 6 may be round as shown in FIGS. 2a and 2b or, alternatively, the entrance passage may have another shape.

The embodiment of the front member shown in FIG. 2a also includes a pair of slots 8 and 10 used in assembling the birdhouse. The slot 8 is provided in the right hand side of the inside face of the front member 4 as shown in FIG. 2a. The slot 10 is provided in the vicinity of the left side of the inside face of the front member 4 as shown in FIG. 2a.

Preferably the slots are formed completely through the thickness of the material making up the front member. The depth of the slots may vary, depending on the embodiment of the birdhouse and particularly depending upon the depth of the slot formed in the corresponding side member to be joined to the front member at that spot. As described below, the components of the invention may be joined with means other than the slots shown in FIGS. 2a and 2b.

As shown in FIG. 2a, the front member 4 may also include a gable 12. The gable 12 may include a protuberance 14 that is for extending into a slot formed in a roof member as described in more detail below. Although the embodiment of the protuberance 14 shown in FIGS. 2a and 2b is generally rectangular, the protuberance may have a variety of shapes. The embodiment of the protuberance 14 shown in FIG. 2a may help to maintain the roof member in position, as described below. However, the protuberance 14 may be shaped according to aesthetic purposes only.

The front member 4 may also include a supporting beam member receiving passage 16. Preferably, if included in the invention, the supporting beam member receiving passage is formed in the gable portion of the front member as shown in FIG. 2a. Although the embodiment of the supporting beam member receiving passage 16 is round, it may have any shape for receiving a supporting beam member if included in the invention. A more detailed description of the supporting beam member is provided below.

The front member 4 may also have other designs. For instance, the front member may not include a gable portion 12 but may still include a protuberance 14 to engage the roof member. As described below, if the components of the birdhouse are joined with means other than the slots 8 and 10 in the embodiment shown in FIGS. 2a and 2b, the front member 4 may not include the slots.

FIG. 2b shows an the inside face of the embodiment of the front member 4 shown in FIG. 2a. The inside face being the face of the front member (or any other component of the birdhouse) that would be directed inwardly, toward the interior of an assembled birdhouse. As can be seen in FIG. 2b, the slots 8 and 10 preferably extend completely through the front member 4.

As shown in FIG. 2b, the front member 4 may include a floor member supporting member 18. The floor member supporting member 18 may be a separate piece attached to the inside face 17 of the front member 4. This separate piece could be glued, nailed, screwed, or welded to the front member. Any other means for attaching the floor member supporting member 18 to the front member 4 could also be used.

Figure 11:
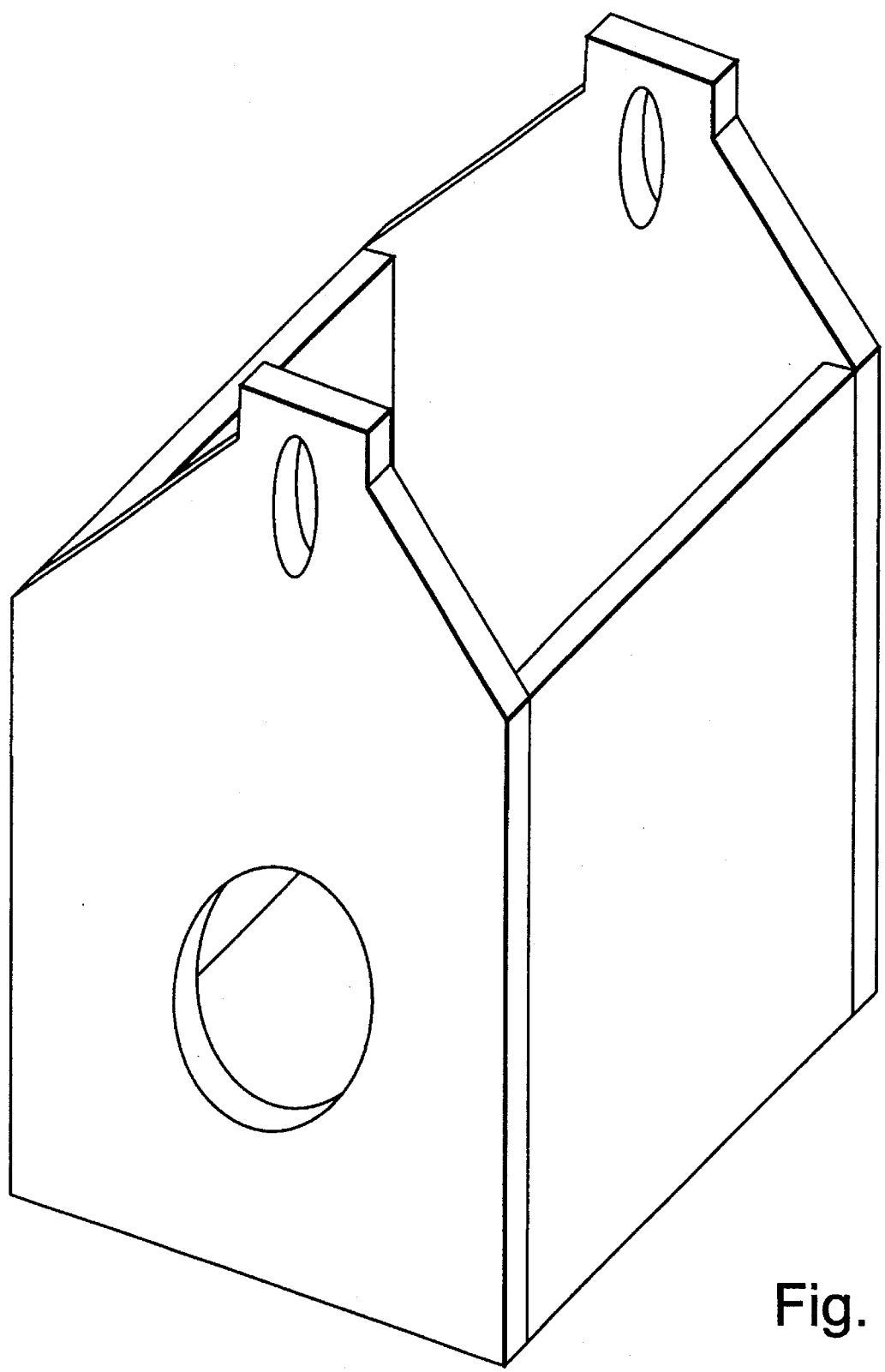
FIG. 11 represents a perspective view of another embodiment of the present invention in which the front member, rear member, right side member, and left side member form a single integral member.
Figure 12A:
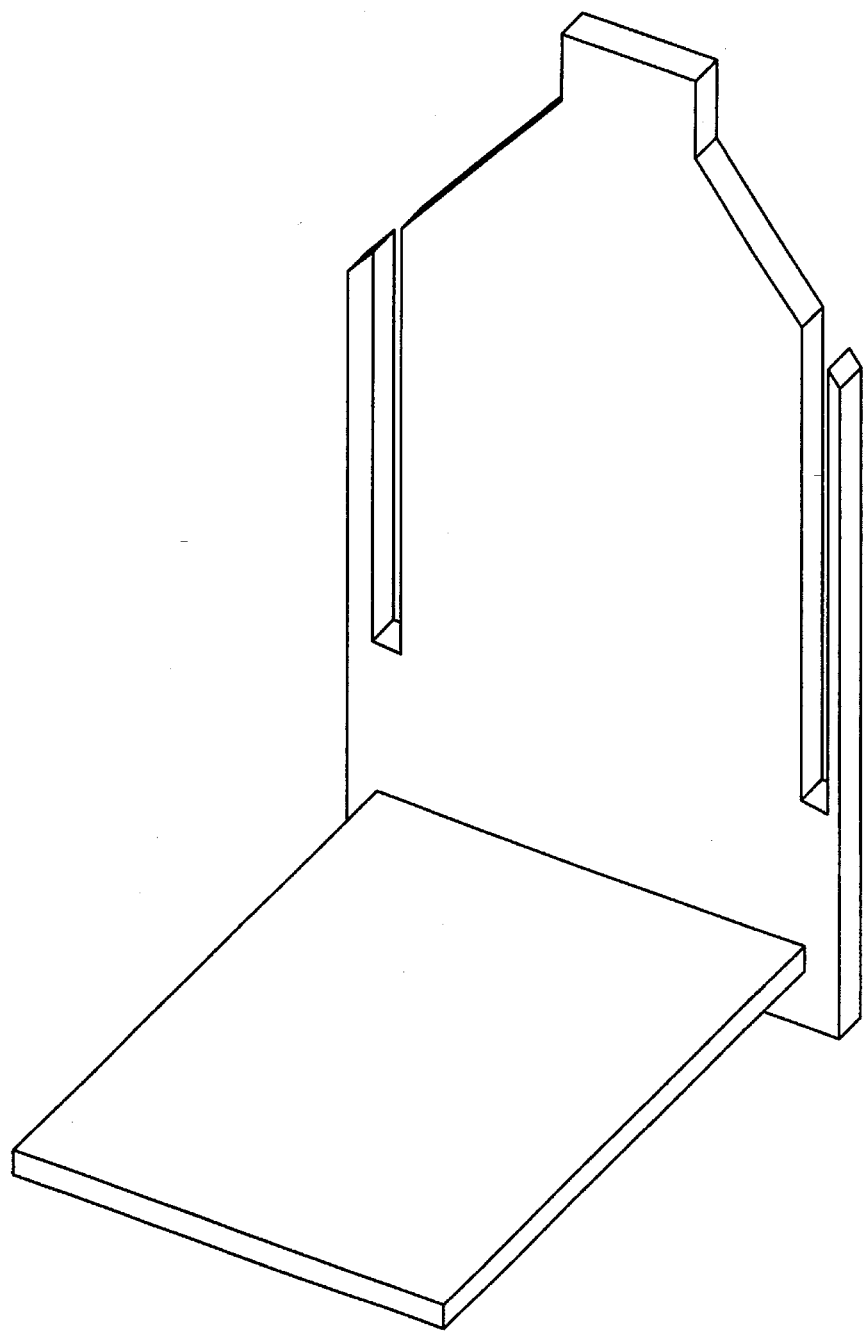
FIG. 12a–c represent a perspective view of further embodiments of the present invention in which at least one of the front member, rear member, right side member, and left side member is integral with the floor member.
Figure 12B:
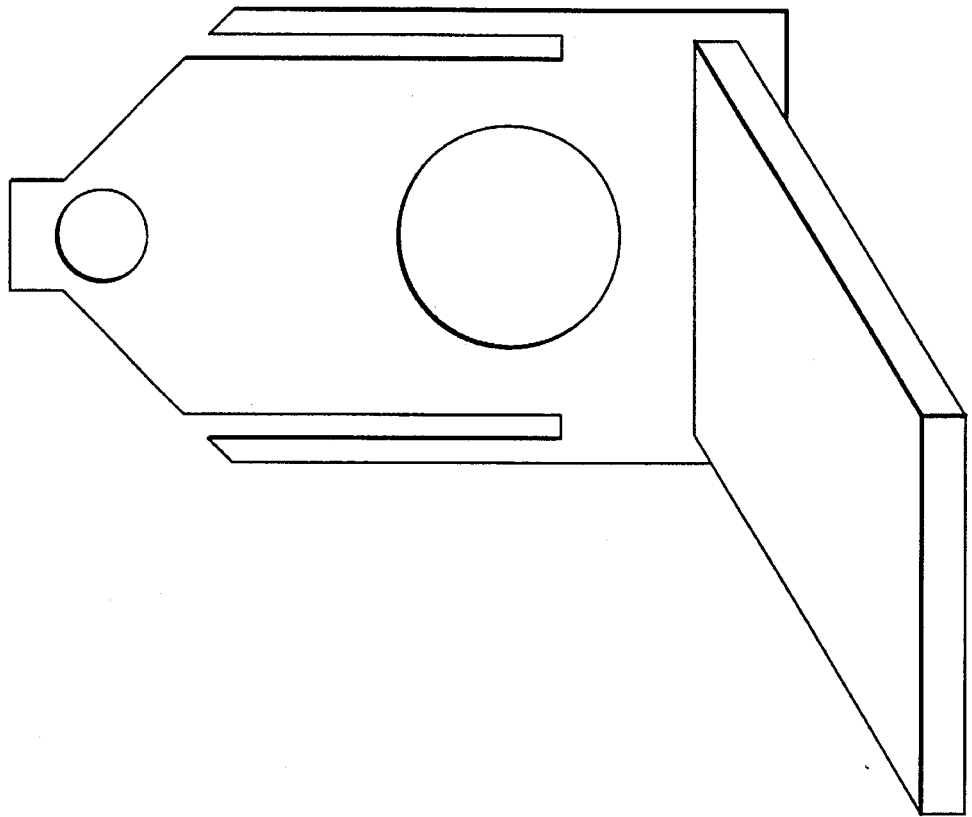

Alternatively, the front member 4 and floor member supporting member 18 could be integrally formed. For instance, the front member 4 and floor member supporting member 18 could be formed from a single piece plastic or carved from a single piece of wood. FIG. 12a shows an example of such an embodiment. On the other hand, FIG. 12b shows an example of an embodiment in which the rear member is integral with the floor member. Along these lines, FIG. 11 shows an example of an embodiment in which the front member, rear member, right side member, and left side member form a single integral member.

FIG. 2c shows a side view of the embodiment shown in FIGS. 2a and 2b. The protuberance 14, and the floor member supporting member 18 may be seen in FIG. 2c.

Figure 2D:
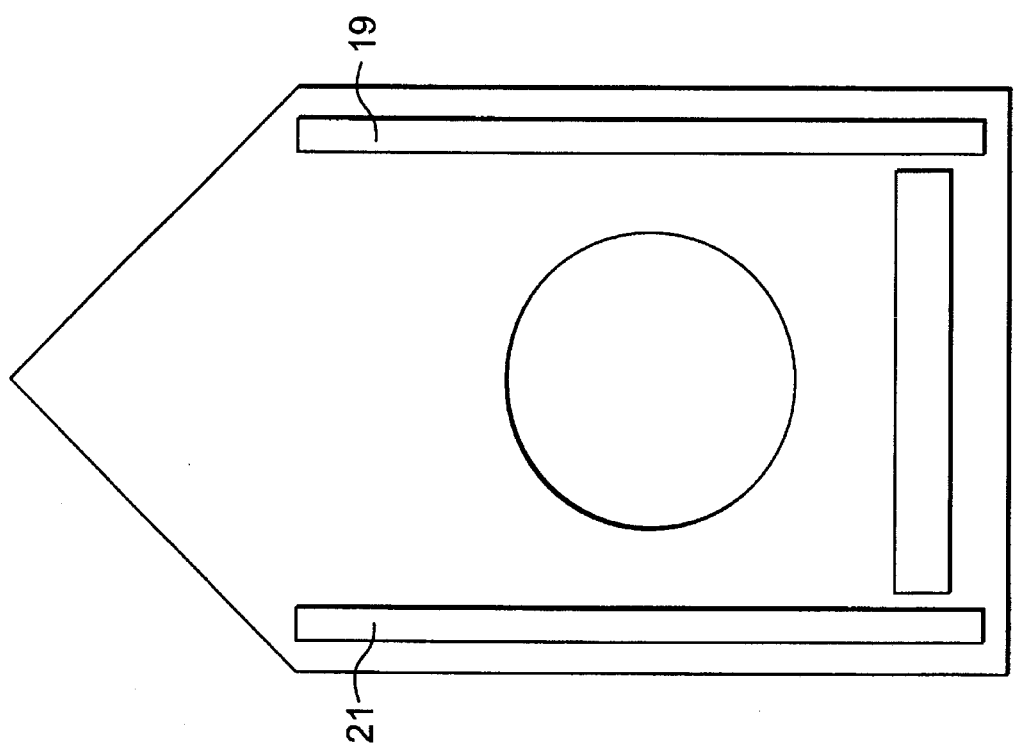
FIG. 2d represents an view of an inside face of another embodiment of a front member according to another embodiment of the invention.

In other embodiments, the inside face 17 of the front member 4 may include one or more grooves formed partially or completely through the front member. FIG. 2d shows an embodiment of the inside face of the front member including two such grooves 19 and 21 in the vicinity of the right and in the vicinity of the left side of the inside face of the rear member. The grooves 19 and 21 may receive the entire edge of the side members. Alternatively, as described below, the side members may include one or more tongues that the groove(s) receive.

The groove(s) may replace slots 8 and 10 in the embodiment shown in FIGS. 2a and 2b. In such an embodiment, rather than including slots 8 and 10, one or more grooves may be formed in a similar location as where the slots are formed in the inside face of the front member. This groove(s) may extend all the way from the top of the front member to the base of the front member or some portion(s) thereof. Such a groove(s) may or may not extend all the way through the front member 4. In other embodiments, a plurality of smaller grooves may be formed in the inside face of the front member. This plurality of grooves could receive a plurality of tongues protruding from the edge of the side members.

In still further embodiments, the inside surfaces of the side members may include at least one groove that receives the edge of the corresponding front or rear member. The front and rear members in such embodiments may include one or more tongues that are received by the grooves of the side members. The grooves in the side members may or may not extend completely through the side members.

Additionally, any other suitable means for joining two members such as the front and side members of the present invention could be used to join the front and side members of the present invention. For instance, the front, rear and side members could be joined with dove-tail joints. Other such means are described below in more detail.

FIG. 3a shows the outside surface 31 of an embodiment of a rear member 20 of the present invention. The rear member 20 preferably is similarly shaped to the front member 4 of the birdhouse 4. However, the front and rear members may be dissimilar in shape.

As seen in FIG. 3a, slots 22 and 24 may be provided in the vicinity of the right and left sides, respectively, of the rear member 20. Preferably, if the birdhouse is to have 4 planar sides, the slots will be formed in approximately the same position on the rear member 20 as they are on the front member 4, alternatively, the slots may be substantially parallel to the slots in the front member and spaced apart substantially the same distance as the slots in the front member.

As in the embodiment shown in FIGS. 3a and 3b, the rear member 20 may also include a gable 26 and a protuberance 28 provided at apex of the gable. The gable 26, as with the gable on the front member 4, may support the roof member of the birdhouse. Similarly, the protuberance 28 of the rear member 20 preferably engages another slot in the roof member of the birdhouse, as described below. The shapes of the gable 28 and the protuberance 28 may or may not be similar to the gable 12 and protuberance 14 of the front member 4.

The rear member 20 may also include a supporting beam member receiving passage 30 formed in the gable 28 of the rear member. The supporting beam member receiving passage 30 may receive a supporting beam member as described in more detail below. Preferably, the supporting beam member receiving passage 30 of the rear member 20 is substantially similar to the supporting beam member receiving passage 16 of the front member 4.

FIG. 3b shows an inside surface 33 of the embodiment of the rear member 20 shown in FIG. 3a. As stated above, the inside surface 33 of the rear member 20 is the surface that will face the interior portion of an assembled birdhouse according to the invention. As seen in FIG. 3b, the rear member may also include a floor member supporting member 32.

Figure 3D:
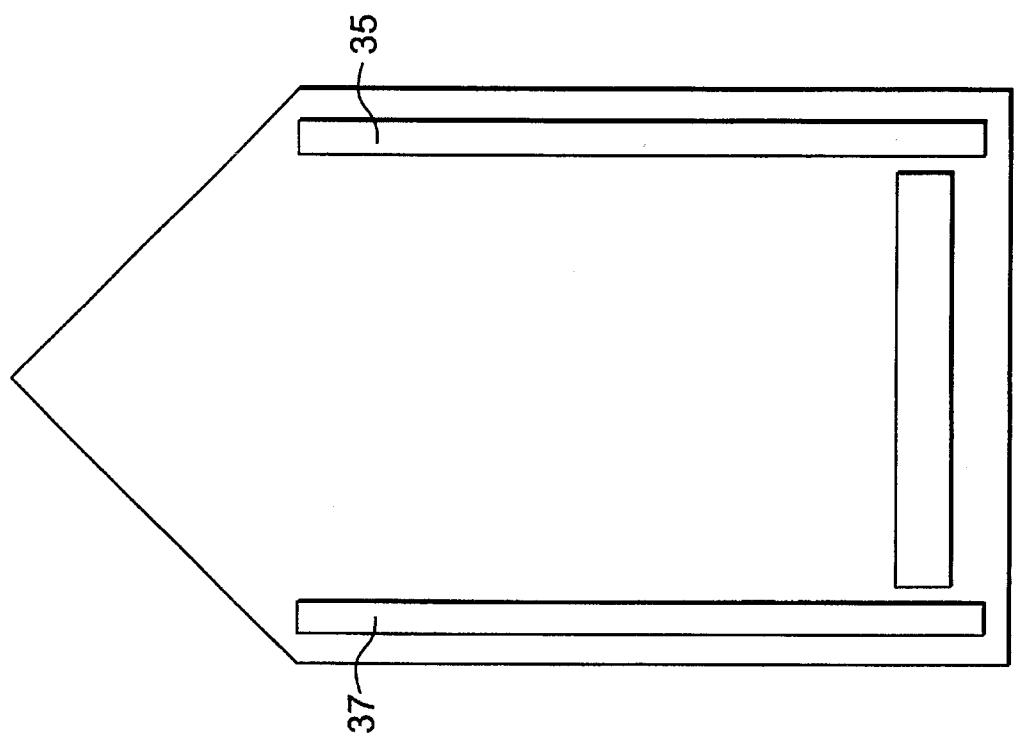
FIG. 3d represents a view of an inside face of another embodiment of a rear member according to another embodiment of the invention.

As with the front member 4, rather than slots 22 and 24, the rear member 20 may include one or more grooves 35 and 37 in the vicinity of the right side and in the vicinity of the left side, respectively, of the inside face of the rear member, similarly to the embodiment of the front member shown in FIG. 2d. The grooves may receive the edge of the side members or one or more tongues extending from the side members. Such an embodiment is shown in FIG. 3d.

FIG. 3c shows a side view of the embodiment shown in FIGS. 3a and 3b. The protuberance 28, and the floor member supporting member 32 may be seen in FIG. 3c.

FIG. 4a shows an inside face 39 of an embodiment of a side member 34 according to the invention. The birdhouse preferably includes two side members. The other side member preferably is substantially similar to the side member shown in FIG. 4a and 4b. However, the two side members may also be dissimilar.

Reference to the location of the side members as being a right side member or a left side member is from the position looking at the front of the birdhouse. Therefore, the right side member is the side member that is on the right hand side of the birdhouse as the assembled birdhouse is viewed from the front. On the other hand, the right and left sides of the various members refers to the side of the specific member when the member is viewed from head on in an assembled birdhouse.

Preferably, if the front member 4 and rear member 20 includes slots 8 and 10 and 22 and 24, respectively, the side members include slots such as the slots 36 and 38 provided in the vicinity of the left and right sides, respectively, of the side member 34. As with the slots in the front member 4 and rear member 20, the slots 36 and 38 may be cut in the side member or the side member may be formed with the slots. The slots 36 and 38 engage the slots 8 and 10 and 22 and 24 in the front member 4 and rear member 20, respectively, of the birdhouse.

Preferably, as with the slots in the front member 4 and the rear member 20, the slots extend completely through the side members, from the outside face to the inside face. Also preferably, the width of the slots of the front member 4, rear member 20, and side members is about the same or slightly larger than the width of the material forming the front, rear, and side members so that when the birdhouse is assembled, the front, rear, and side members will tightly engage each other and there will not be much play in the connections between the members.

The length of the slots in the side members may vary, depending on the length of the corresponding slot in the front or rear member. Preferably, the slots in the front, rear, and side members are each long enough so that when the side members and front and rear members are joined together, the birdhouse has a uniform bottom edge. In other words, preferably, the bottom edges of the side members and front and rear members of an assembled birdhouse are all substantially co-planar. However, the slots may be of different lengths, and the bottom edges of the various member may not be substantially co-planar.

If the slots in the side members and the front rear members are formed about equal to the width of the material making up the front, rear and side members or slightly bigger than the thickness of the material, then the side and front and rear members should tightly engage each other thereby making a tight joint that will not allow the birdhouse to move about.

In other embodiments in which the side members are joined to the front and rear in which the front and rear members include grooves that the edges of the side members are inserted into, the side members may not be provided with any slots. The entire edges of the side members of such embodiments may be received by the grooves in the front and rear members. Alternatively, the edges of the side members may include one or more tongues that represent less than the entire length of the side members. Such tongues could be received by one or more grooves provided in the front and rear members.

As also stated above, the side members may include one or more grooves that receive the edges of the front or rear members. Additionally, the front and rear members may include one or more tongues extending from their edges. This tongue(s) may be received by the one or more grooves of the side members.

Additionally, the side members may be joined to the front and rear members with other joints. In such cases the edge of the side members may be appropriately configured for the joint involved. In some embodiments, the side members, front member, and rear member may not include any grooves, slots, or other joints interconnecting the members. In such embodiments, the side members and front and rear members may be secured together with one or more fasteners, such as nails, screws, hooks and eyelets, or velcro, for example.

Figure 12C:
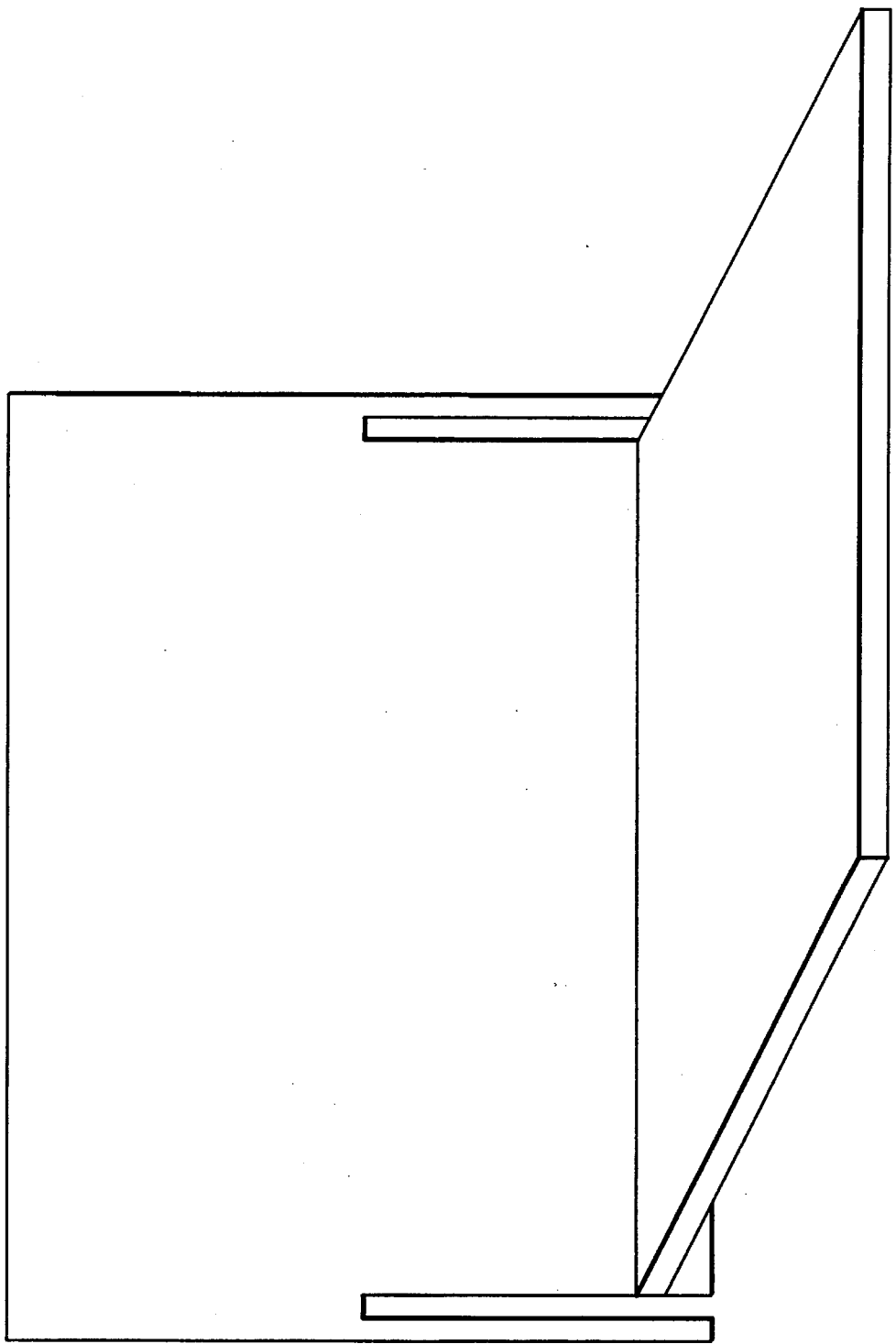

As shown in FIG. 4a, the side member 34 may also include a floor member supporting member 40. As discussed above, the floor member supporting member 40 may be attached to the side member 34 or may be formed integrally with the side member. FIG. 12c shows an example of such an embodiment.

Preferably, the side members are about as tall as the front and rear members at the base of the gables of the front and rear members when the birdhouse is assembled. However, the side members may be of any desired length.

FIG. 4b shows a side view of the embodiment of the side member shown in FIG. 4a. The floor member supporting member 40 may be seen in FIG. 4b.

Figure 5B:
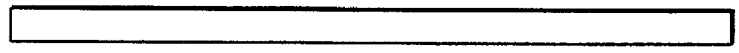
Figure 5A:
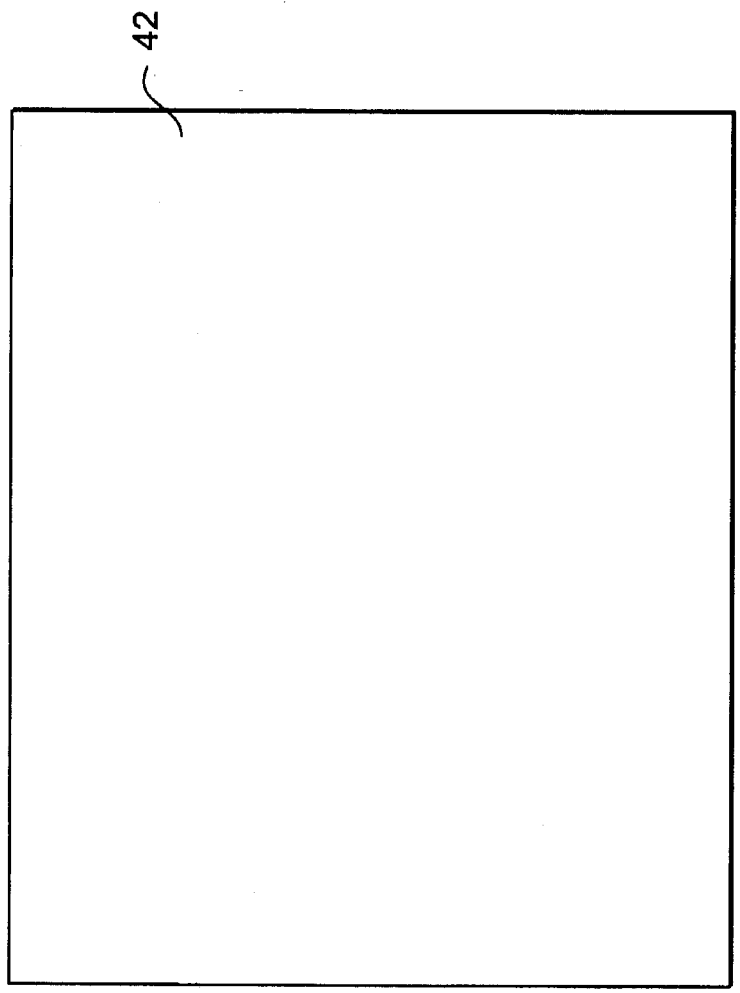
FIG. 5a represents an overhead view of one embodiment of a floor member according to the invention.

FIG. 5a shows a top view of an embodiment of a floor member 42 according to the present invention. The floor member 42 may be made of the same or a different material as the other components of the birdhouse. As stated above, the floor member 42 preferably is supported by floor member supporting members 18, 32, and 40 on the front member 4, rear member 20, and side members 34, respectively. However, the floor member supporting members 18, 32, and 40 may be provided only on the front member 4 and rear member 20 or the two side members 34.

The dimensions of the floor member 42 preferably are no larger than the dimensions of the front member 4, rear member 20, and side members 34 of the embodiment that the floor member is used with. However, the floor member 42 should be large enough to ensure that it will be supported by the floor member supporting members 18, 32, and 40 of the front member 4, rear member 20, and side members 34, respectively. Also, the floor member 42 may be of any desired thickness. Preferably, the floor member 42 is thick enough that it will support one or more adult birds, a nest, and one or more baby birds. FIG. 5b shown a side view of the embodiment of the side member 42 shown in FIG. 5a.

Although the front member, rear member, side members, and floor member are shown in the Figures to all be separate, one or more of these components may be a unitary member. For example, the front member, rear member, and side members may all be connected with flexible members, such as fabric or flexible plastic. This unitary member may be collapsed by folding along the seams between the front, rear, and side members. Alternatively, each of the front and rear member could be attached to one side member. The floor member could also be attached to one of the front, rear, or side members and simply pushed down into place after the positioning or connecting of the front, rear, and/or side members.

Furthermore, in some embodiments, the front and rear members could be formed from a single piece from, for instance, corrugated plastic. The plastic could be scored in the manner described above for the roof member. The scoring would allow the side members and front and rear members to be folded and clasped into a single flat member and folded sufficiently to fit inside of the roof member. Alternatively, for example, four pieces of wood could be used to form the side members and front and rear members. These pieces of wood could be joined by for instance pieces of fabric or pieces of plastic that are sufficiently flexible to allow the side members and front and rear members to be folded onto each other to form a stack that would fit inside of the folded over roof member.

Figure 6:
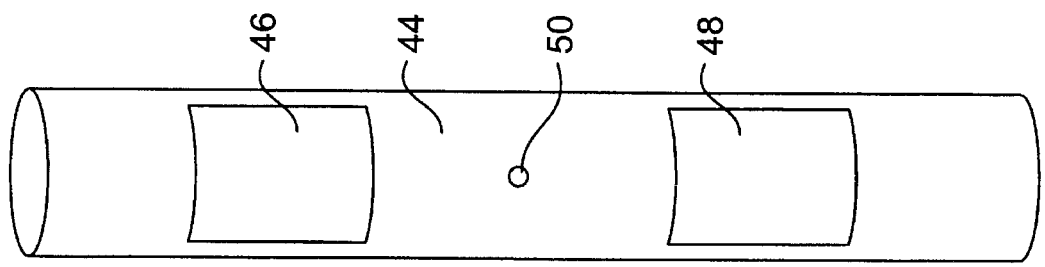
FIG. 6 represents a perspective view of an embodiment of a roof support beam member according to one embodiment of the invention.

FIG. 6 shows a perspective view of an embodiment of a supporting beam member 44. The supporting beam member 44 may help to support the roof member of an assembled birdhouse according to the invention. The supporting beam member 44 may be a cylindrical piece of wood, plastic, metal, or any other suitable material. The supporting beam member 44 may have other shapes as well. For instance, the supporting beam member 44 could have a square cross section. Preferably, the supporting beam member 44 has substantially the same cross section as the supporting beam member receiving passages 16 and 30 in the front member 4 and rear member 20, respectively.

The supporting beam member 44 may be provided with one or more pieces of a hook-and-loop-type fasteners 46 and 48. When the supporting beam member 44 is inserted into the supporting beam member receiving passages 16 and 30 in the gables 12 and 26 of the front and rear members, respectively, and the roof member is placed in position on the assembled birdhouse, as described below, the fasteners 46 and 48 may engage similar type fasteners in the inside surface of the roof member as described in more detail below. According to such embodiments, either the hook or the loop of the fastener may be attached to the supporting beam member and the other of the hook and the loop may be attached to the inside surface of the roof member. Preferably, the hook and/or loop are attached to the supporting beam member 44 and the roof member in locations such that the portions of the fastener will meet and substantially overlap when the roof member is placed over the partially assembled birdhouse as shown in the Figures and as described below.

The supporting beam member 44 may also include a predrilled hole 50 for receiving a securing member. The securing member could be a screw eye-type member for attaching a string, chain, or hook to hang the birdhouse. Any other securing member could also be used to attach the birdhouse to a tree, post, or other support.

Figure 7:
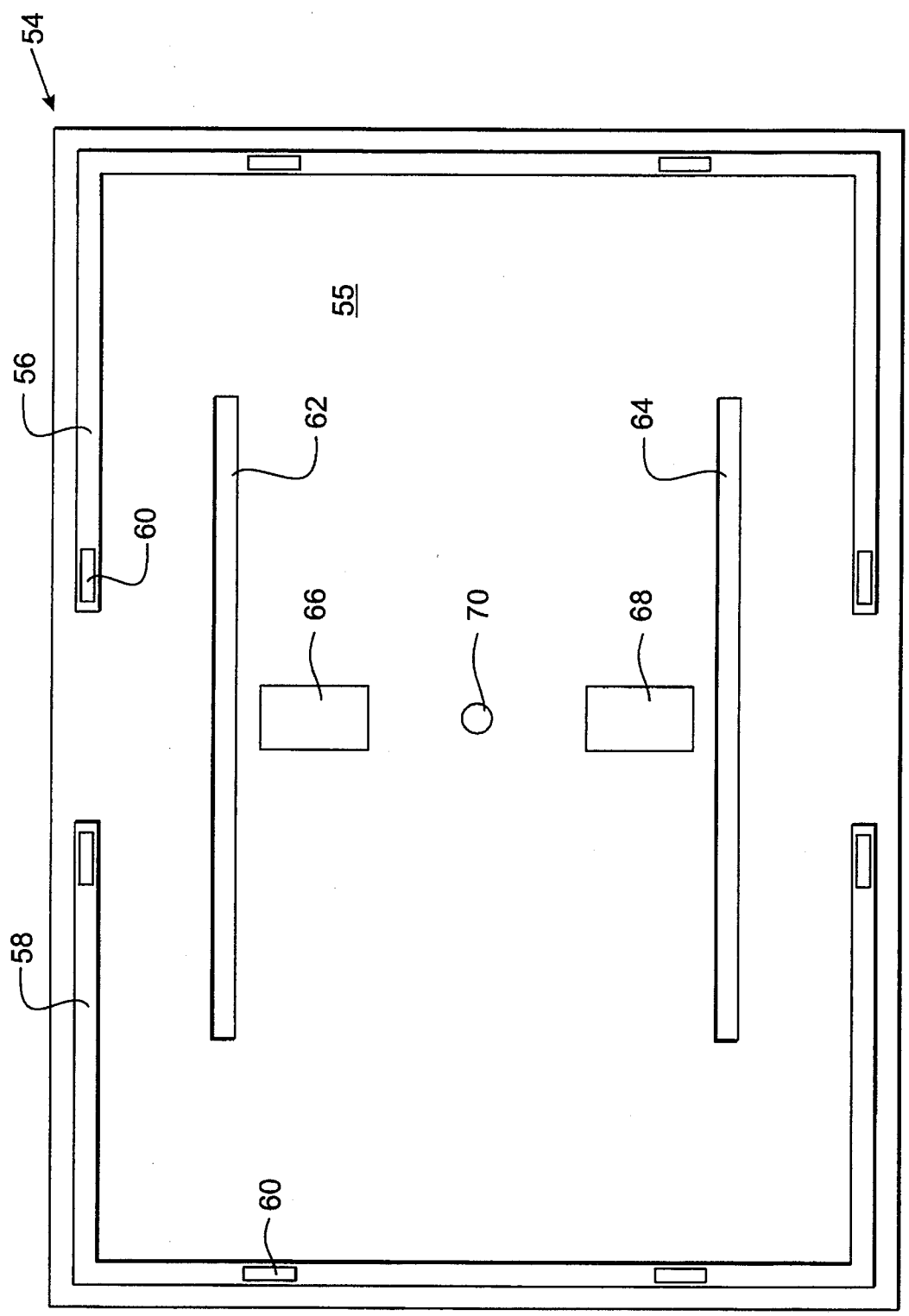
FIG. 7 represents an overhead view of an inside surface of one embodiment of a roof member according to the present invention.

FIG. 7 shows an overhead view of the inside surface 55 of an embodiment of a roof member 52 according to the invention. The roof member may be formed from the same or a different material(s) as the other components of the birdhouse. Additionally, the roof member 54 may be formed from a single piece of material or two or more pieces making up less than the entire roof.

In one embodiment, the roof member 54 is formed from two pieces, each making up substantially one-half of the roof member. These two pieces may then be joined in the middle by one or more resilient members, such as a piece of fabric. Alternatively, the two half pieces could each be joined to opposite sides of a third member that could form the spine of the folded over roof member as shown in FIG. 1. The two approximately one-half pieces could each be joined to the third piece with one or more resilient members, such as a piece(s) of fabric. In such an embodiment, the third piece could actually be split into three pieces to accommodate the front and rear member receiving slots. Each of the three pieces could separately be joined to the two half pieces.

If the roof member 54 is formed of one piece of material, the outside surface, that surface of the roof member 54 that would face away from the interior of the assembled birdhouse, could be scored, thereby allowing the roof member to bend without breaking. The roof member 54 could also be formed of a material sufficiently resilient to prevent the material from breaking when folded along the lines shown in FIG. 1.

A material that is particularly suited to form a one-piece roof member is a corrugated plastic material similar to corrugated cardboard used in boxes. The corrugated plastic material may be scored along a middle portion, in between the corrugations that connect the opposite surfaces of the material.

The roof member 54 of the present invention preferably is provided with at least two lip members 56 and 58, one on each side of the middle portion, or minor axis, of the roof member 54 forming the spine of the folded over roof member as shown in FIG. 1. In the embodiment shown in FIG. 7, each lip member 56 and 58 extends substantially about one-half of the perimeter of the roof member 54 with the exception of the middle portion of the roof member in the vicinity of the minor axis. The lip members 56 and 58 preferably do not extend into the middle portion of the roof member 54 so as to allow the roof member to be folded in half and accommodate the other members of the birdhouse within the roof member.

The lip members preferably extend far enough from the inside surface 55 of the roof member 54 that when the roof member is folded along its minor axis, the combined thickness of the lip members will be greater than or equal to the thickness of the front member 4, rear member 20, and side members 34. Having lip members of such height permits the lip members to prevent the other components of the birdhouse from escaping from the folded over roof member 54. Furthermore, the lip members preferably extend a sufficient distance about the halves of the inside surface of the roof member so as to prevent any of the other components of the birdhouse from slipping out of the folded over roof member.

In some embodiments, a plurality of lip members may extend from the inside surface 55 of the roof member 54. In such embodiments, the plurality of lip members preferably are close enough together and extend sufficiently around the halves of the inside surface of the roof member to prevent the other components of the birdhouse from slipping between the lip members and falling out of the folded over roof member. Such lip members preferably extend away from the inside surface as far as the lip members 56 and 58.

According to still further embodiments, the edges of the roof member may have an L-shape. Such an embodiment of a roof member could be formed from vacuum-molded plastic. The L-shape could extend continuously about the edge of the roof member similarly to the lip members shown in FIG. 7. Alternatively, the portion of the L-shaped edge functioning as the lip members could be comprised of a plurality of sections, similarly to the plurality of lip members that may extend about the edge of the roof member. The L-shaped edge could serve the same function as lip members attached to the inside surface of the roof member.

Whether each half of the inside surface of the roof member includes one lip as in the embodiment shown in FIG. 7, a plurality of lip members, or an L-shaped edge(s), the lip members may be provided with fastening means to secure the halves of the roof member together when the other members of the birdhouse are placed within the roof member and the roof member is folded in half. The fastening means in the embodiment shown in FIG. 7 includes members 60. In the embodiment shown in FIG. 7, each lip member includes four securing members 60.

In the embodiment shown in FIG. 7, the securing members are hook-and-loop-type fasteners, such as VELCRO. Accordingly, the hook or the loop is provided on one of the lip members and the other of the hook and loop is provided on the other loop member opposite the hook and/or loop member on the other lip. In this embodiment, when the roof member is folded over, the hooks and loops on opposite lip members will engage each other, thereby maintaining the roof member folded over and the other components of the birdhouse inside the roof member.

According to other embodiments of the invention, rather than being secured with hook and loop type fasteners, the halves of the roof member may be secured with a hook that engages a member such as an eyelet on an adjacent portion of the opposite half of the folded over roof member. The roof member could also be secured with a strap of a hook-and-loop-type fastener engaging an opposite portion of a hook-and-loop-type fastener attached to the outside surface of the roof member adjacent the ends of the roof member that are brought into contact as the roof member is folded over. Any other means for securing or latching two members together may be used to hold the folded over roof closed.

The roof member 54 preferably also includes a pair of front and rear member receiving slots 62 and 64 for receiving the side members. The front and rear member receiving slots may receive the gables apexes of the gables of the front and rear members of the birdhouse if these members include gables. If the front and rear members include a protuberance portion as in the embodiments shown in FIGS. 2a–c and 3a–c, the front and rear member receiving slots 62 and 64 will receive these protuberance portions as well. Preferably, the front and rear member receiving slots 62 and 64 are long enough to accommodate at least an upper portion of the gables or at least the protuberance portion. The front and rear member receiving slots 62 and 64 may also be long enough to receive the entire gable of each of the front member 4 and the rear member 20. The slots 62 and 64 may also receive a portion of the front and rear members below the gables.

As shown in FIG. 7, the roof member 54 may also include securing members 66 and 68. In embodiments of the invention that include a supporting beam member 44 that includes hook-and-loop-type securing members, the securing members 66 and 68 may comprise the other of the hook or loop attached to the supporting beam member. In such embodiments, the hook-and-loop-type fasteners on the supporting beam member and the roof member may help to secure the roof member to a assembled birdhouse. In such embodiments, the supporting beam member may be packaged/stored on the inside surface of the roof member 54 when the roof member is folded in half, as in the embodiment shown in FIG. 1. The securing beam member may be secured in place by the hook-and-loop-type fasteners on the supporting beam member and the roof member.

The roof member may also include an opening 70 permitting passage of a chain, hook, screw or other securing member attached to the supporting beam member so that the birdhouse can be hung from a tree or other support, if desired.

The present invention also includes methods of assembling a knockdown birdhouse. According to the methods, the halves of the birdhouse are first separated and the components of the birdhouse removed from within the folded over roof member. The components of the birdhouse may then be assembled.

Depending upon the design of the components of the birdhouse and connections for joining the side members and the front and rear members, the method for assembling the birdhouse of the invention may vary. If the side members and front and rear members are joined with slots as shown in the front member, rear member, and side members shown in FIGS. 2a–c, 3a–c, 4a, and 4b, then assembly of the birdhouse would be along the lines shown in FIG. 8. Although one sequence is described for connecting the components of the birdhouse, the steps could be carried out in another sequence.

Figure 8:
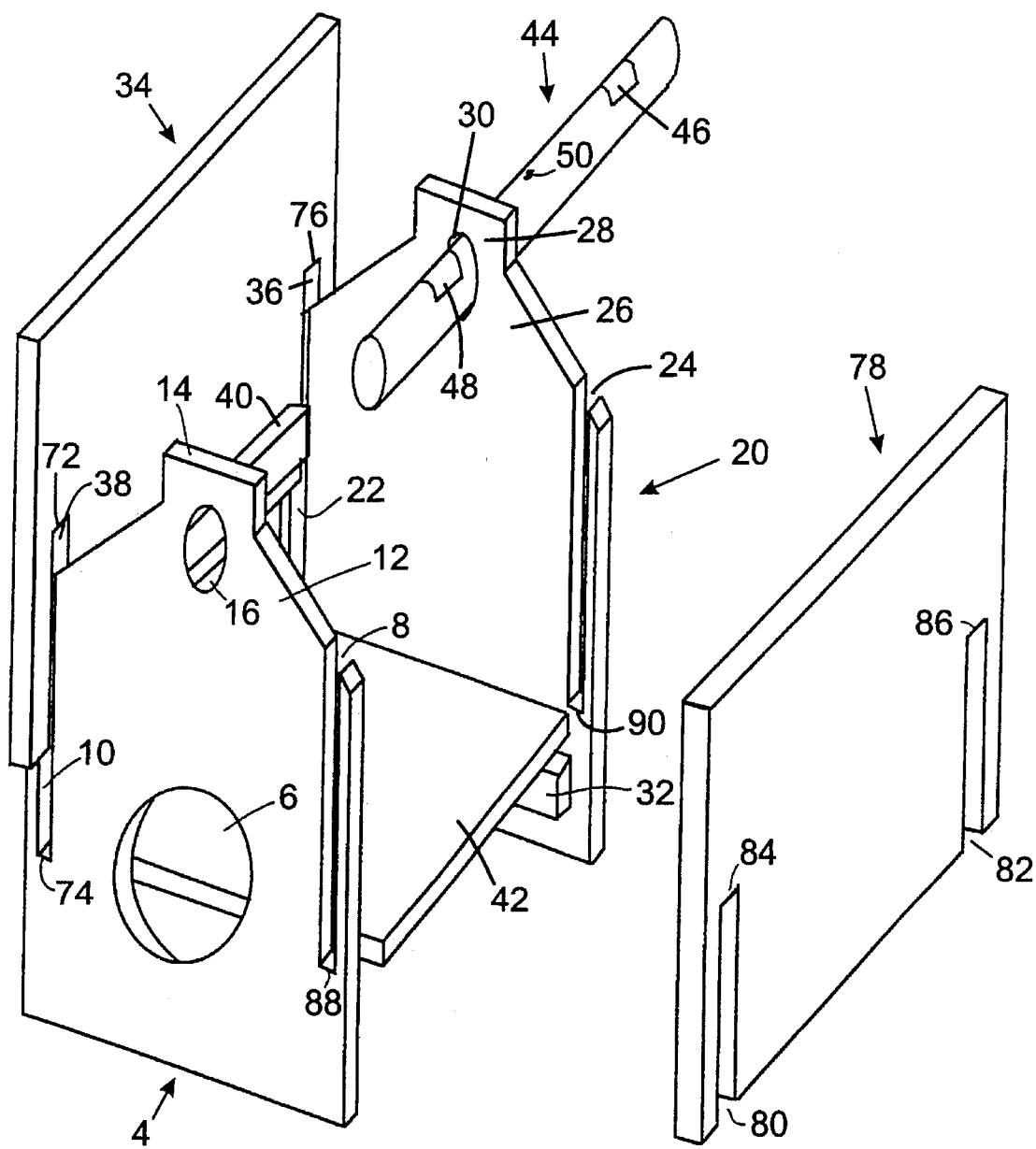
FIGS. 8 and 9 represent perspective views of different stages of the assembly of one embodiment of a birdhouse according to a method for assembling a birdhouse according to the invention.
Figure 9:
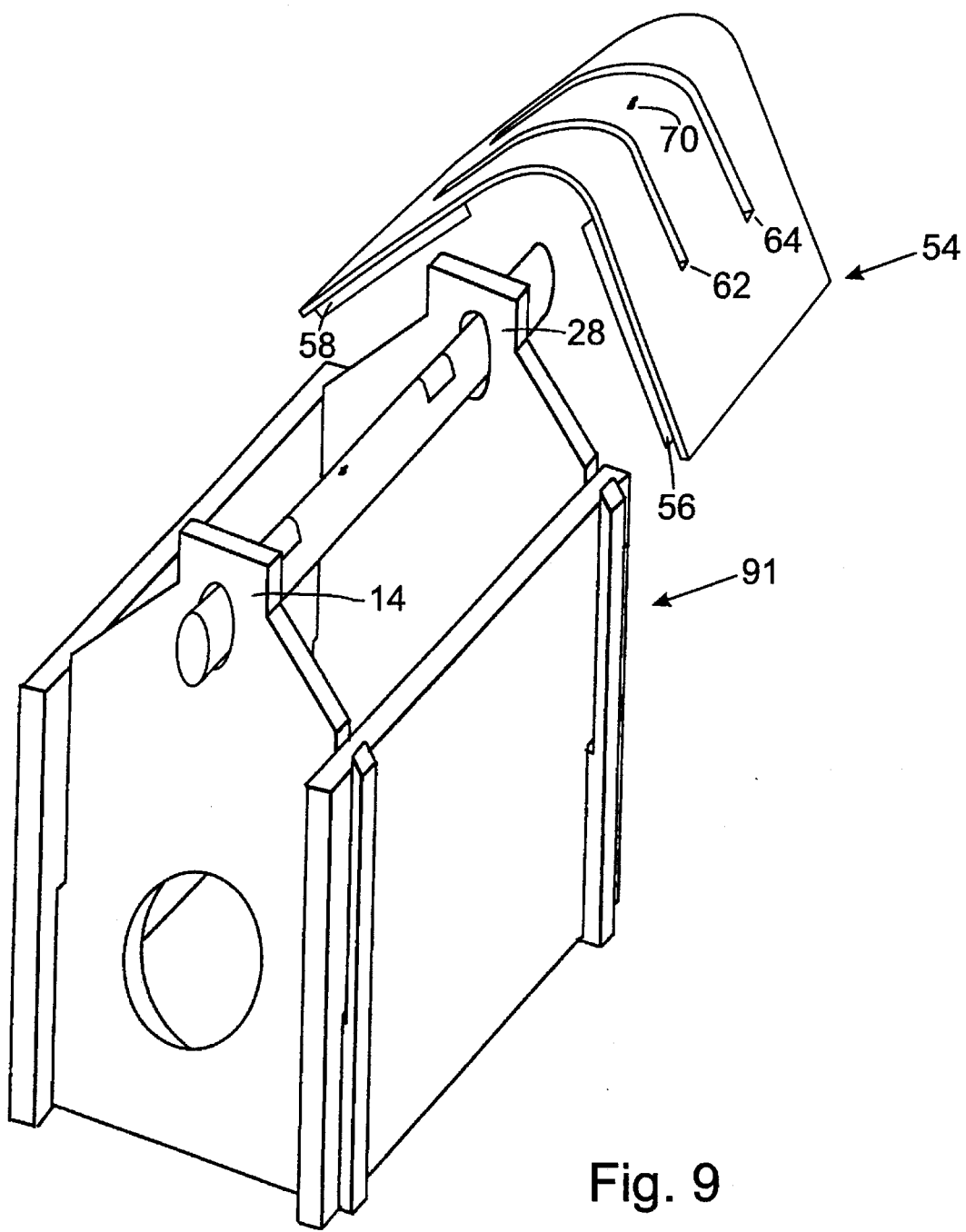

According to the method of assembly shown in FIG. 8, preferably, one of the slots in one of the side members is first aligned with one of the slots in either the front or the rear member. By saying that the slots are aligned, it is meant that the slots are positioned so as to be co-axial. For instance, as shown in FIG. 8, the slot 38 in the vicinity of the right side of the left side member 34 could be aligned with the slot 10 in the vicinity of the left side of the front member 4. As stated above, the sides of the various components are the sides of the components when viewing the outside surface of the components. After aligning the slots, either the front member is moved upwardly as shown in FIG. 8 and/or the side member 34 is moved downwardly as shown in FIG. 8 until the base 72 of the slot 38 in the vicinity of the right side of the side member 34 contacts the base 74 of the slot 10 in the vicinity of the left side of the front member 4, or until the bases of the slots are in the vicinity of each other.

Next, the slot 36 in the vicinity of the left side of the left side member 34 may be aligned with the slot 22 in the vicinity of the right hand side of the rear member 20. Then, the side member 34 and/or the rear member 20 may be moved toward each other until a base 76 of the slot 36 in the vicinity of the left side of the left side member 34 contacts a base of the slot 22 in the vicinity of the right side of the rear member 20. On the other hand, the right side member could first be attached to the front member similarly to the attachment of the left side member as described above.

Alternatively, the slots 36 and 38 in the vicinity of the left side and in the vicinity of the right side, respectively, of the left side member 34 may be simultaneously aligned with the slots 22 in the vicinity of the right side of the rear member 20 and the slot 10 in the vicinity of the left side of the front member 4, respectively. Then, the left side member 34, the front member 4, and/or rear member 20 may be moved toward each other until the bases 76 and 72 of the slots 36 and 38, respectively, in the vicinity of the left side and the right side, respectively, of the left side member 34 contact the bases of the slots 22 and 10, respectively, in the vicinity of the right side of the rear member 20 and in the vicinity of the left side of the front member 4, respectively. Such a method of assembly is illustrated in FIG. 8. According to such a method, next, the slots 84 and 86 in the vicinity of the left and right sides respectively of the right side member 78, shown in FIG. 8, may be aligned with the slots 8 and 24 in the vicinity of the right side of the front and in the vicinity of the left side of the rear member, respectively.

After aligning the slots 84 and 86 in the right side member 78, the left side member 34, and/or the front member 4 and rear member 20 are moved toward each other until the bases 84 and 86 of the slots 80 and 82, respectively, contact the bases 88 and 90 of the slots 8 and 24, respectively.

As will be appreciated by those skilled in the art, the various slots connecting the right and left side members and the front and rear members may be aligned and moved into connection in any order.

According to other embodiments of the invention the side members and front and rear members may be joined using different connections. For instance, as stated above, the front member 4, the rear member 20, and/or the side members 34 and 78 may include one or more grooves and/or one or more tongues for engaging the grooves. According to such embodiments, rather than first aligning the slots as described above, the edges of the side or front and rear members or tongues provided on or in the vicinity of the edges of the side or front and rear members will be aligned with the grooves in the side or front and rear members. The edges of the members or the tongues will then be inserted into the grooves. These aligning and inserting steps will be repeated until all of the side members, front member, and rear member have been connected together.

If the embodiment includes dove-tail joints, the various portions of the dove-tail joints on the side, front and rear members will be aligned. Then, the joints will be forced together, inserting the proper portions of the dove-tail joints in the corresponding portion of the joint on the appropriate member. With a dove-tail joint, as with any of the joints discussed above, the members may be connected together with screws, nails, or any other suitable member. In fact, side members, front member, and rear member may not include any joint and may just be nailed or screwed together or joined with any other suitable fastener.

According to embodiments that include a unitary member that includes the side members, the front member and the rear member, the unitary member could be unfolded and then, if necessary, free ends of the unitary member could be joined together. The free ends of the unitary member may include a joint as described above. If birdhouse includes two unitary members that each includes the front member or rear member and one of the side members, then these two unitary members could be joined with one of the joints described above, according to the methods as described above.

Preferably, regardless of the forms of the front, rear, and side members, after the side members, front and rear member are joined, the floor member 42 is placed in position on the floor member supporting members 18, 32, and 40 on the front member 4, rear member 20, and/or side members 34 and 78, respectively. Two of the floor member supporting members 32 and 40 on the rear member 20 and side member 34, respectively, may be seen in FIG. 8. Alternatively, the floor member may be placed in position prior to the connecting together of the side members, front member, and rear member. The side member may, in some embodiments, be secured to the floor member supporting members, front, rear, and/or side members. Any sort of mechanical attachment, such as nails or screws, or adhesive or other securing means may be used to secure the floor member in place, if desired.

Next, if the embodiment includes a supporting beam member 44, the supporting beam member may be inserted into the supporting beam member receiving passages 30 and 16 in the rear member 20 and the front member 4, respectively. Preferably, the supporting beam member 44 is inserted such that equal portions of the supporting beam member 44 extend outwardly beyond the outside surfaces of the front member 4 and the rear member 20. The insertion of the supporting beam member 20 is also shown in FIG. 8.

Next, the roof member 54 preferably is attached to the partially assembled house 91. To attach the roof member 54, the slot 62 and 64 in the roof member are aligned with the front member 4 and rear member 20. Then, at least one of the roof member and the unfinished house 91 is moved toward the other. As the roof member 54 is moved toward the unfinished house 91, the side members extend into the slots 62 and 64 in the roof member. If included, the upper portion of the gables 12 and 26 and/or the protuberances 14 and 28 of the gables 12 and 26, respectively, of the front member and rear member 20, respectively, extend through the slots 62 and 64, respectively, of the roof member. The roof member 54 may be moved toward the unfinished house until at least the upper portion of gables 12 and 26 extends into the slots 62 and 64, respectively, in the roof member 54.

Preferably, at least one of the roof member 54 and the unfinished birdhouse 91 continue to be moved until the roof member engages an upper surface of one of a variety of different members of the unfinished birdhouse 91. For example, the inside surface of the roof member 54 may come to rest on, among other surfaces, the supporting beam member 44. In this embodiment, the supporting beam member 44 and the roof member 54 may include hook-and-loop-type fasteners 46 and 48 and 66 and 68, respectively, that will engage each other. The roof member 54 may also come to rest on at least a portion of the upper surfaces of the side members 34 and 78.

Figure 10:
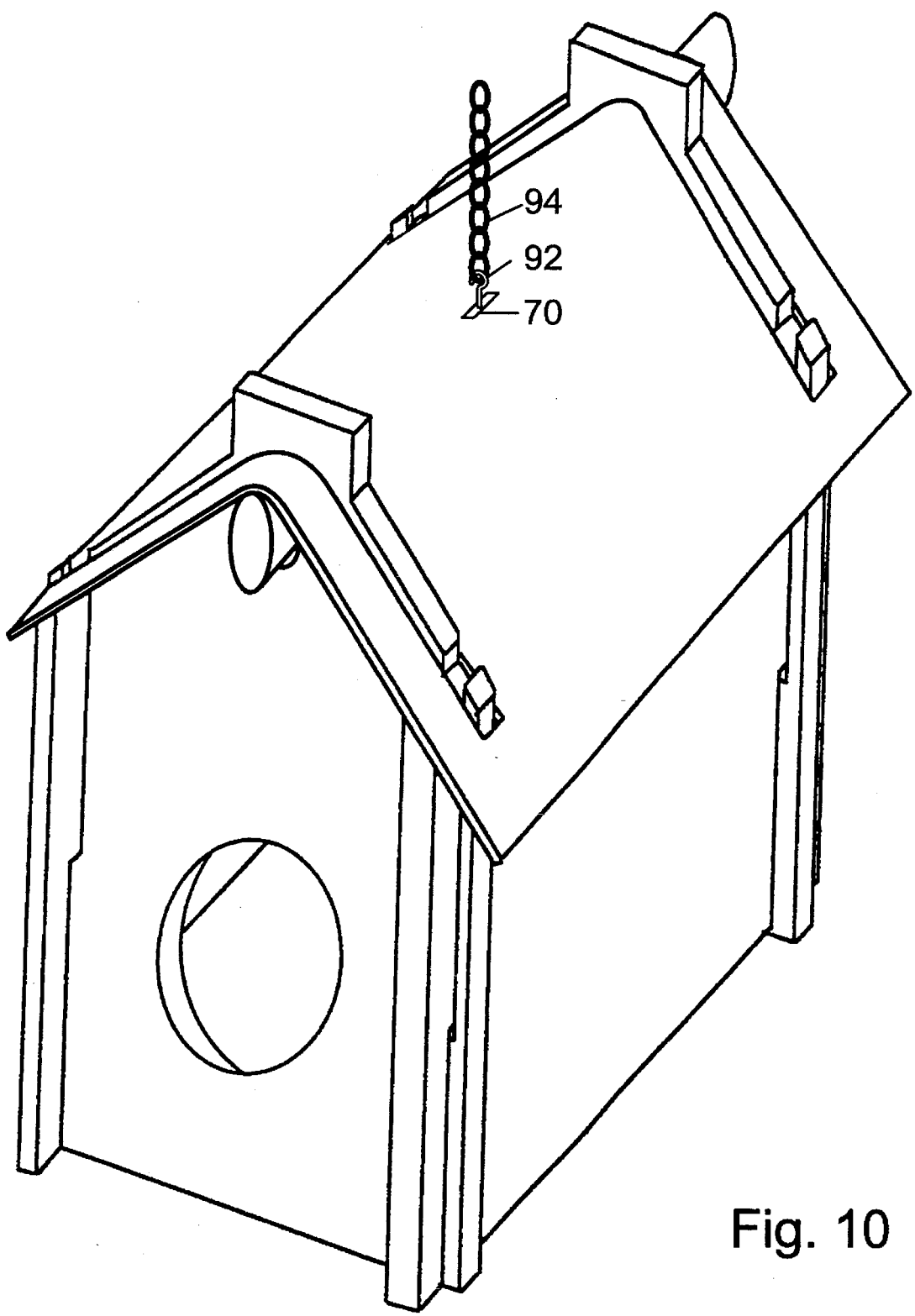
FIG. 10 represents a perspective view of one embodiment of a fully assembled birdhouse according to the invention.

Prior to lowering the roof member over the unfinished house, a securing member 92, shown in FIG. 10, may be attached to the supporting beam member 44. For instance, the securing member could be an eyelet that is screwed into the supporting beam member as in the embodiment shown in FIG. 10. Then, in order to hang the birdhouse from a tree branch or other support, a chain 94 could be attached to the securing member 92. In other embodiments, string or wire could also be used to hang the birdhouse. Alternatively, the birdhouse could be secured to a post or pole or other support with nails, screws, or other suitable fastening means.

As can be appreciated from the above description, the birdhouse is also easily disassembled so as to allow it to be cleaned or stored during the wintertime when birds may not need nesting sites provided by the birdhouse or for moving. The house may be disassembled by removing the roof member 54. Then, the supporting beam member 44 may be removed, if the embodiment includes a supporting beam member. Next, the floor member may be removed. Subsequently, the side members, front member, and rear member may be separated. In the embodiment shown in FIG. 8, this may be accomplished by lifting the side members 34 and 78 up while the front and rear members remain stationary.

After disassembly, the components of the birdhouse may be stored in the roof member 54. The components of the birdhouse may also be packaged within the roof member for first time or re-sale.

To package or store the birdhouse, the side members 34 and 78, front member 4, and rear member 20, and floor member 54 can be placed on one half of the inside surface of the roof member laid out as shown in FIG. 7. In some embodiments, the side member, front member, and rear member may be positioned between the securing members 66 and 68 and one of the lips 56 and 58. Then, the securing beam member 44, if included in the invention, may be secured to the roof member by placing the securing members 46 and 48 of the supporting beam member in contact with the securing members 66 and 68 of the roof member.

Next, one end of the roof member may be moved toward the other end of the roof member, folding the roof member into along its minor axis, until the lip member 58 contacts the lip member 56. If the roof member includes hook-and-loop-type fasteners 60 about the lip members 56 and 58, then the hook-and-loop-type fastener 60 will be brought into contact as the roof member is folded in half, thereby helping to secure the halves of the roof member together. With the halves of the roof member held together, the lip members will help to prevent the other components of the birdhouse within the roof member from escaping.

If the birdhouse does not include hook and loop type fasteners on the lips 56 and 58, other means could be used to secure the halves of the roof member together. For instance, a hook could be provided on half and an eyelet could be provided on the other half and then when the two halves of the roof member are brought together, the hook is placed within the eyelet. Alternatively, a string could be wrapped around the entire birdhouse and tied thereby securing it. As can be appreciated, a variety of means exist for securing the halves of the roof member together to contain the components of the birdhouse within the folded over roof member.

The birdhouse may be stored this way and/or marketed this way, thereby eliminating the need for wasteful packaging material and providing a package for the birdhouse that will never be lost since it is formed from part of the birdhouse.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. A knock-down birdhouse, comprising:

a front member including an entrance;

a rear member;

two side members;

a floor member; and a roof member including at least two lip members provided at least partially around opposite inside surfaces of said roof member in the vicinity of an edge of said roof member such that said lip members face each other when said roof member is folded over, wherein in a disassembled state, said roof member being foldable to accommodate all other members of said knock-down birdhouse, said birdhouse members being retained within said foldable roof member by said lip members.

2. A knock-down birdhouse according to claim 1, wherein said front member, said rear member, and said side members include a plurality of interengaging slots for joining said members together.

3. A knock-down birdhouse according to claim 2, wherein said front member includes a slot provided in the vicinity of a right and a left side;

said rear member includes a slot provided in the vicinity of a right and a left side;

each of said side members includes a slot provided in the vicinity of a right and left side; and said right side slot of said front member engages said left front slot of said right side member, said left side slot of said front member engages said right front slot of said left side member, said left side slot of said rear member engages said right side slot of said right side member, and said right side slot of said rear member engages said left side slot of said left side member.

4. A knock-down birdhouse according to claim 1, wherein:

said front member and rear member each include a gable; and said roof member further comprises two slots, said slots being provided such that said gables engage said slots when said birdhouse is assembled.

5. A knock-down birdhouse according to claim 1, wherein said floor member is supported by said front member, said rear member, and said side members.

6. A knock-down birdhouse according to claim 5, wherein each of said front member, said rear member, and said side members includes a floor support member provided on a lower, inner surface.

7. A knock-down birdhouse according to claim 1, further comprising a support beam, wherein said front member and said rear member further include a support beam member receiving passage provided in the vicinity of the top of said front member and said rear member for receiving said support beam.

8. A knock-down birdhouse according to claim 7, wherein said front member and said rear member include gables and said support beam member receiving passage is provided in said gables.

9. A knock-down birdhouse according to claim 7, further comprising at least one fastener for securing said roof member to said support beam member.

10. A knock-down birdhouse according to claim 9, wherein said fastener is a hook-and-loop-type fastener, wherein one of said hook and loop is attached to said support beam member and the other of said hook and loop is attached to said roof member.

11. A knock-down birdhouse according to claim 7, further comprising a hanging assembly for hanging said birdhouse.

12. A knock-down birdhouse according to claim 1, wherein said front member and said rear member each include a groove provided in an inside surface in the vicinity of a right side and a left side, said grooves receiving said edges of said side members.

13. A knock-down birdhouse according to claim 11, wherein said hanging assembly comprises a first support member attached to said support beam member, said roof member includes a passage through which said first support member extends, said hanging assembly further comprising a second support member for attaching said birdhouse to another structure.

14. A knock-down birdhouse according to claim 1, wherein said right side member and said left side member each include a groove provided in an inside surface in the vicinity of a right and a left side, said grooves receiving said edges of said right side member and said left side member.

15. A knock-down birdhouse according to claim 1, wherein said front member, said rear member, said right side member and said left side member are a single integral member.

16. A knock-down birdhouse according to claim 1, wherein at least one of side front member, said rear member, said right said member or said left side member is integral with said floor member.

17. A knock-down birdhouse according to claim 1, further comprising a hook-and-loop-type fastener provided on said lip members of said roof member, wherein one of said hook and said loop is provided on one of said lip members and the other of said hook and said loop is provided on another of said lip members, whereby when said roof member is folded over, said hook and said loop engage each other, thereby hindering said roof from opening.

18. A method of building a birdhouse from a plurality of quickly assembled and disassembled members including a front member including an entrance hole, a rear member, a right side member, a left side member, a floor member, and a roof member; said front member including a gable and a slot provided in the vicinity of a right side and a left side; said rear member including a gable and a slot provided in the vicinity of a right and a left side; said right side member including a slot provided in the vicinity of a right and left side; said left side member including a slot provided in the vicinity of a right and left side; said roof member being foldable to accommodate other members of said knock-down birdhouse when said knock-down birdhouse is in a disassembled state, said roof member including a front member receiving slot and a rear member receiving slot; and said side members include a floor member supporting member, said method comprising the steps of:

a) unfolding said roof member and removing said front member, said rear member, said side members, and said floor member;

b) aligning said slot in the vicinity of said left side of said right side member with said slot in the vicinity of said right side of said front member;

c) moving said right side member and said front member in opposite directions parallel to each other until a base of said slot of said right side member contacts a base of said slot of said front member;

d) aligning said slot in the vicinity of said right side of said right side member with said slot in the vicinity of said left side of said rear member;

e) moving said right side member and said rear member in opposite directions parallel to each other until a base of said slot of said right side member contacts a base of said slot of said rear member;

f) aligning said slot in the vicinity of said right side of said left side member with said slot in the vicinity of said left side of said front member;

g) moving said side left member and said front member in opposite directions parallel to each other until a base of said slot of said left side member contacts a base of said slot of said front member;

h) aligning said slot in the vicinity of said left side of said left side member with said slot in the vicinity of said right side of said rear member;

i) moving said left side member and said rear member in opposite directions parallel to each other until a base of said slot of said left side member contacts a base of said slot of said rear member;

j) positioning said floor member on said floor supporting members;

k) aligning said slots of said roof member with said gables of said front member and said rear member; and l) moving said roof member toward said front member and said rear member until said gables extend through said slots in said roof member and an under side of said roof member contacts said front member and said rear member.

19. A method of building a birdhouse from a plurality of quickly assembled and disassembled members including a front member including an entrance hole, a rear member, a right side member, a left side member, a floor member, and a roof member; said front member including a gable and a groove provided in the vicinity of a right side and a left side of an inside face of said front member; said rear member including a gable and a groove provided in the vicinity of a right and a left side of an inside face of said rear member; said roof member being foldable to accommodate other members of said knock-down birdhouse when said knock-down birdhouse is in a disassembled state, said roof member including a front member receiving slot and a rear member receiving slot; and said side members include a floor member supporting member, said method comprising the steps of:

a) unfolding said roof member and removing said front member, said rear member, said side members, and said floor member;

b) placing a left edge of said right side member in said groove in the vicinity of said left side of said inside face of said rear member;

c) placing a right edge of said left side member in said groove in the vicinity of said right side of said inside face of said front member;

d) placing a right edge of said right side member in said groove in the vicinity of said right side of said inside face of said rear member;

e) placing a left edge of said left side member in said groove in the vicinity of said left side of said inside face of said rear member;

f) positioning said floor member on said floor supporting members;

g) aligning said slots of said roof member with said gables of said front member and said rear member; and h) moving said roof member toward said front member and said rear member until said gables extend through said slots in said roof member and an under side of said roof member contacts said front member and said rear member.

20. A method of packaging a knock-down birdhouse, said birdhouse comprising a plurality of quickly assembled and disassembled members including a front member including an entrance hole, a rear member, a left side member, a right side member, a floor member, and a roof member, said roof member including at least two lip members provided at least partially around opposite inside surfaces of said roof member in the vicinity of an edge of said roof member such that said lip members face each other when said roof member is folded over, said lip members including a hook-and-loop-type fastener, said method comprising the steps of:

a) placing said front member, said rear member, said right side member, said left side member, and said floor member on a surface of said roof member;

b) folding said roof member along a middle portion, thereby bring said lip members into contact, thereby engaging said hook and loop fastener.

* * * * *